(12) United States Patent
Zhang et al.

(10) Patent No.: US 6,895,504 B1
(45) Date of Patent: May 17, 2005

(54) ENABLING SECURE COMMUNICATIONS WITH A CLIENT

(75) Inventors: Minda Zhang, Hudson, MA (US); Pranav H. Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 09/676,068

(22) Filed: Sep. 29, 2000

(51) Int. Cl.[7] ............................................. H04L 9/00
(52) U.S. Cl. ................................................ 713/175
(58) Field of Search ............................... 713/175, 189; 380/277

(56) References Cited

U.S. PATENT DOCUMENTS

| | | | | |
|---|---|---|---|---|
| 4,529,870 A | * | 7/1985 | Chaum | ..................... 235/380 |
| 5,784,461 A | * | 7/1998 | Shaffer et al. | ................. 705/51 |
| 5,963,646 A | * | 10/1999 | Fielder et al. | ............... 380/259 |
| 6,370,649 B1 | * | 4/2002 | Angelo et al. | .............. 713/202 |
| 6,418,472 B1 | * | 7/2002 | Mi et al. | ..................... 709/229 |
| 6,523,067 B2 | * | 2/2003 | Mi et al. | ..................... 709/229 |

* cited by examiner

Primary Examiner—Gregory Morse
Assistant Examiner—Jacob Lipman
(74) Attorney, Agent, or Firm—Michael R. Barre

(57) ABSTRACT

A unique processor serial number may be utilized to augment a device key seed stored in a non-volatile memory. In this way, a relatively secure system may be enabled that facilitates renewing the device key. An integrated circuit may include a transport demultiplexer and key logic. The key logic communicates with the processor using a secure protocol. The key logic can generate random numbers that may be hashed with the processor serial number and the device key seed to generate a device key. The device key may be provided to a head end to facilitate secure communications between the head end and the client.

24 Claims, 5 Drawing Sheets

ENABLING SECURE COMMUNICATIONS WITH A CLIENT

BACKGROUND

This invention relates generally to enabling secure communications between an a head end or server and a receiving client, for example in systems that distribute television content, software or other content electronically.

In a digital broadcast system, digital content may be transmitted from a head end or server to a plurality of receivers or clients. Ideally, the system is secure enough to prevent hackers from intercepting the content and viewing it without paying for the content. Similarly, other electronic communications may be sent in the same fashion including application programs as another example.

In each case, conditional access services may be provided using a device key to enable secure communications between the head end and the client. One approach to providing such a system is to use a smart card reader at the client. However, the smart card system can be hacked since it is possible to obtain the information from the smart card and then to use it to receive the services for free. The hacker merely monitors the smart card interface. The hacker may thereafter use computing resources to decipher the data using a distributed attacking scheme and distribute a control word such as a session key in real time over the Internet.

Similar approaches involve installing a unique device key into a flash memory or an electrically erasable programmable read only memory (EEPROM) as an alternative to a smart card. An encryption scheme may be used to pass the device key into a transport demultiplexer or other conditional access service receiver before receiving conditional access services. However, the standalone, non-volatile memory device may easily be removed and replaced by a hacker.

As another approach, a unique device key may be integrated into a non-volatile memory device that is part of the transport demultiplexer module. However, the drawback of such an approach is a lack of renewability of the device key and the relatively higher manufacturing cost.

Still another approach is to have a manufacturer key burned into the transport demultiplexer at the client. The head end then generates and sends the device key covered by the manufacturing key to each client. Although this approach provides an effective way to renew the device key, it enables those clients with the same manufacturer key to steal the device key when the head end sends the key down to the client who subscribes to the broadcasting service.

Thus, there is a need for better ways to secure transmissions between a head end and a client that enables the device key to be renewed while reducing the likelihood of a device key being intercepted.

DETAILED DESCRIPTION

Figure 1:
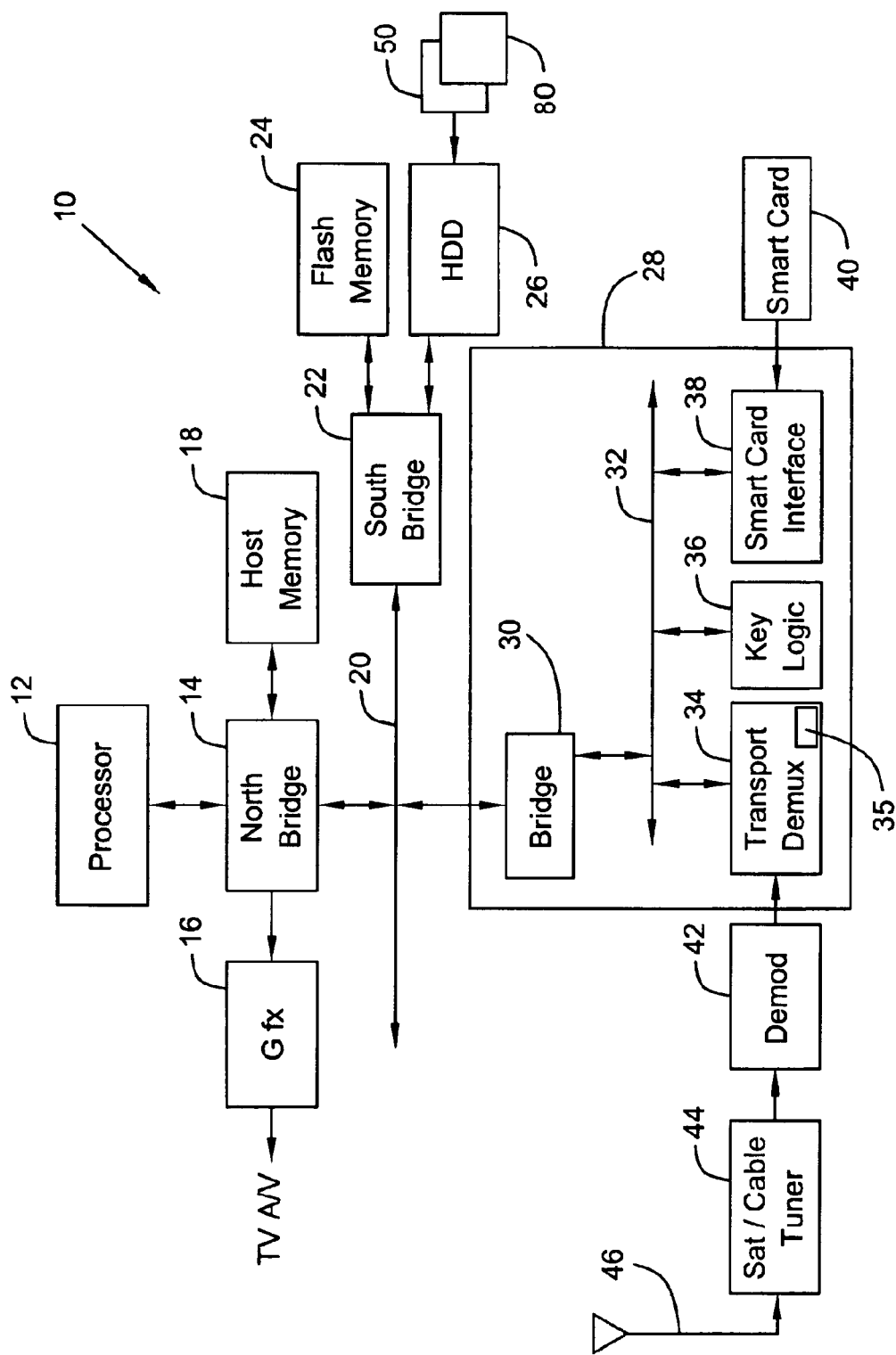
FIG. 1 is a block diagram of hardware in accordance with one embodiment of the present invention.

A receiver or client 10, shown in FIG. 1, may receive conditional access services via an input device 46 such as an antenna, a cable connection, a satellite receiver or an Internet connection, as examples. The services may be digital broadcast services, application program services or other electronic data or content. The client 10 may include a processor 12. Advantageously, the processor 12 has a unique processor identifier or serial number called a CPUID and implements instructions to provide the CPUID at the operating system kernel level upon request. One such processor is the Pentium® III processor available from Intel Corporation, Santa Clara, Calif.

The processor 12 couples to a north bridge 14 that in turn is coupled to a graphics chip 16 and a host memory 18. The graphics chip 16, in one embodiment of the present invention, may be coupled to a television or other audio/video output device.

The north bridge 14 is coupled to a bus 20 that couples to a south bridge 22. The south bridge 22 may be coupled to a non-volatile memory 24 such as a flash memory. In one embodiment of the present invention, the memory 24 may store a basic input/output system (BIOS). The memory 24 may also store a device key that is used to convert between plain text and cipher text in accordance with one embodiment of the present invention. A hard disk drive 26 may also be coupled to the south bridge 22. The hard disk drive 26 may store software 50 and 80 for implementing conditional access services in accordance with one embodiment of the present invention.

The bus 20 is also coupled to a chip or integrated circuit 28. In one embodiment, the integrated circuit 28 may include a transport demultiplexer 34 and a key logic 36 integrated into the same semiconductor die. Thus, one can not readily intercept communications between the key logic 36 and the transport demultiplexer 34. In one embodiment of the present invention, the device key may be stored in a memory 35 in the transport demuliplexer 34. The integrated circuit 28 also includes a bridge 30 that couples the circuit 28 to the bus 20. In some embodiments, the circuit 28 may include its own bus 32 that couples the key logic 36 and the transport demultiplexer 34. A smart card interface 38 and smart card 40 may also be provided in some embodiments.

The integrated circuit 28 may be coupled to a demodulator 42 and a tuner 44 that receive input signals from the head end or server via the input device 46. Thus, in a digital broadcasting embodiment the transport demultiplexer 34 demultiplexes the digital broadcast information received from the head end. The client 10 may only demultiplex the information if the client 10 is authorized to receive such broadcasts as determined by the cooperation of the processor 12, the key logic 36 and the memory 24 in a fashion described in more detail hereinafter.

Figure 2:
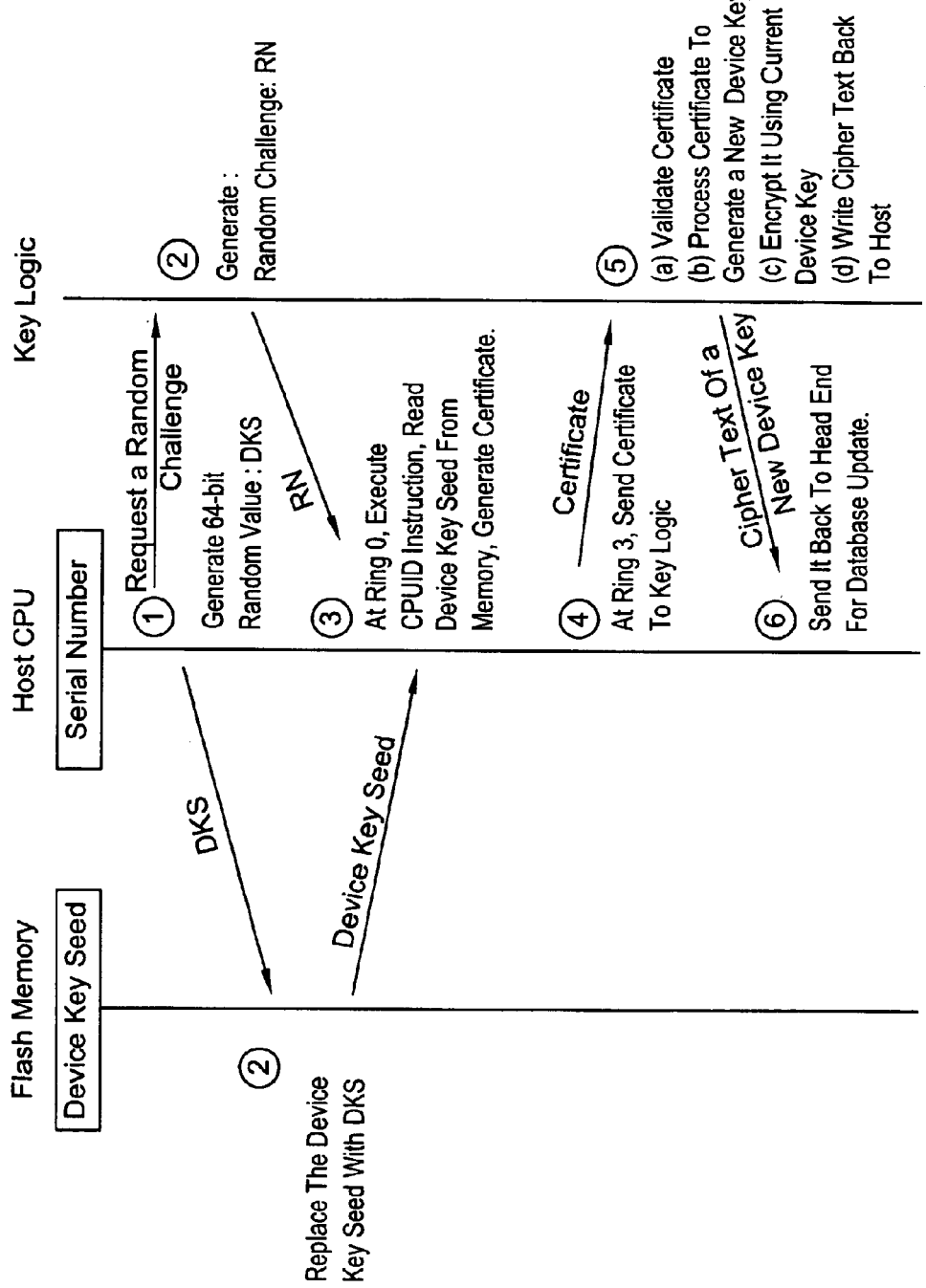
FIG. 2 is a chart that shows the flow for developing the device key and providing it to a head end in accordance with one embodiment of the present invention.

Referring to FIG. 2, the processor 12 initiates the procedure of developing the device key for transmission to the head end so that the head end can provide conditional access services to the client 10. The processor 12 requests a random challenge or random number. In one embodiment of the present invention, the random number is generated by the key logic 36. The random number or random challenge is then transmitted back to the processor 12. At the same time, the processor 12 generates a device key seed or starting value that may be a 64-bit value in one embodiment. The device key seed may then be sent by the processor 12 to the memory 24. The device key seed, originally stored in the memory 24, may be replaced with the device key seed generated by the processor 12.

The device key seed received from the memory 24 is then sent back to the processor 12. At the operating system kernel level, the processor 12 executes the CPUID instruction, reads the device key seed from the memory 24 and generates a certificate. Thus, at the operating system kernel level (which is generally inaccessible to application programs), the processor 12 uses its own CPUID instructions to obtain its own unique serial number, obtains the device key seed from the memory 24 and hashes all this information to generate a secure certificate. Public key or symmetric key based cipher systems may be used to generate the secure certificate. However, the underlying signing key may be based on the unique CPUID. The routine for generating the secure certificate may be protected using tamper resistant software (TRS) agents.

The certificate is then sent by the processor 12 to the key logic 36. The certificate ensures secure communications between the processor 12 and key logic 36. The key logic 36 validates the certificate and processes the certificate to generate a new device key. Moreover, the key logic 36 encrypts the new device key using the current device key and then writes the cipher text back to the host processor 12. In addition, the cipher text of the new device key may be written to the head end by the processor 12 in order for the head end to update its database of device keys for various clients 10.

Figure 3:
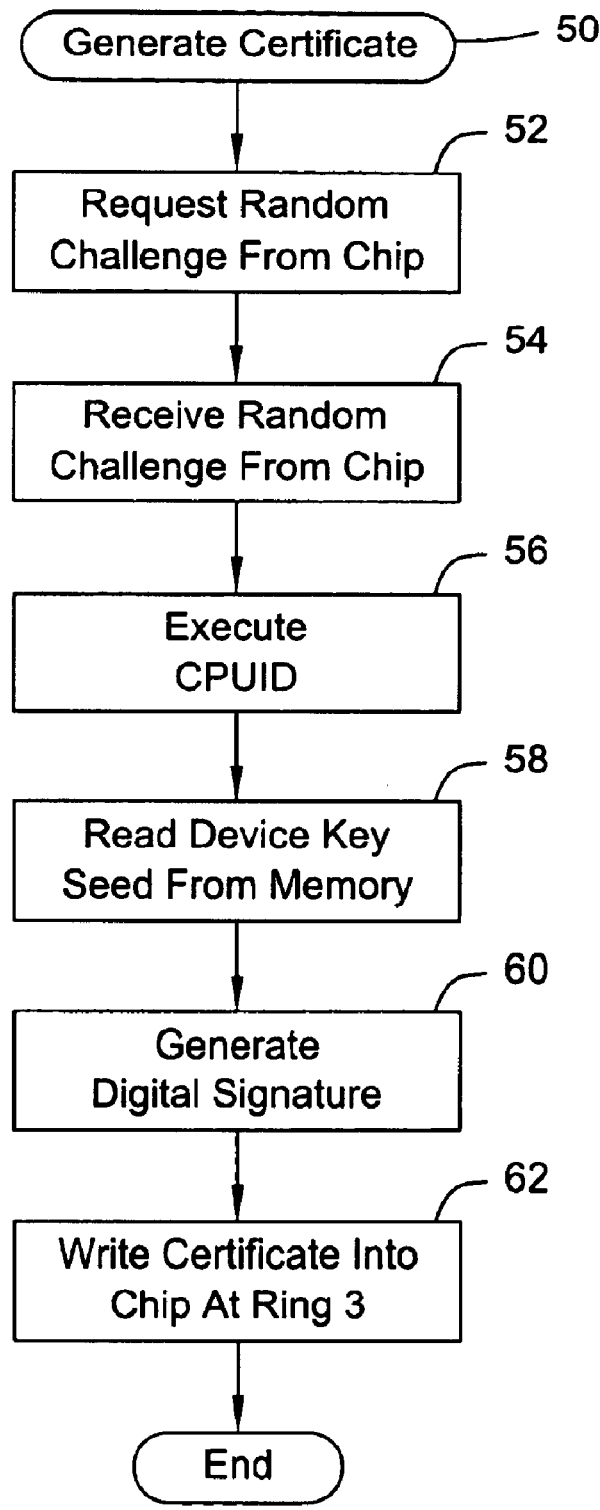
FIG. 3 is a flow chart for generating a digital certificate in accordance with one embodiment of the present invention.

The software 50, shown in FIG. 3, for generating the certificate, in one embodiment, may begin by requesting a random challenge from the key logic 36, as indicated in block 52. The processor 12 then receives the random challenge from the key logic 36, as indicated in block 54. The processor 12 also executes its CPUID instructions as indicated in block 56 in order to obtain its own unique serial number.

Thereafter, the processor 12 reads the device key seed from the memory 24 as indicated in block 58. Using the device key seed, the CPUID, and the random number challenge, the processor 12 generates a digital signature as indicated in block 60. The digital signature or certificate is then written into the integrated circuit 28 at the application level as indicated in block 62. In this way, the integrated circuit 28 can be sure that the communications it is receiving are authentic and that a hacker is not attempting to substitute a new device key for the actual device key.

Figure 4:
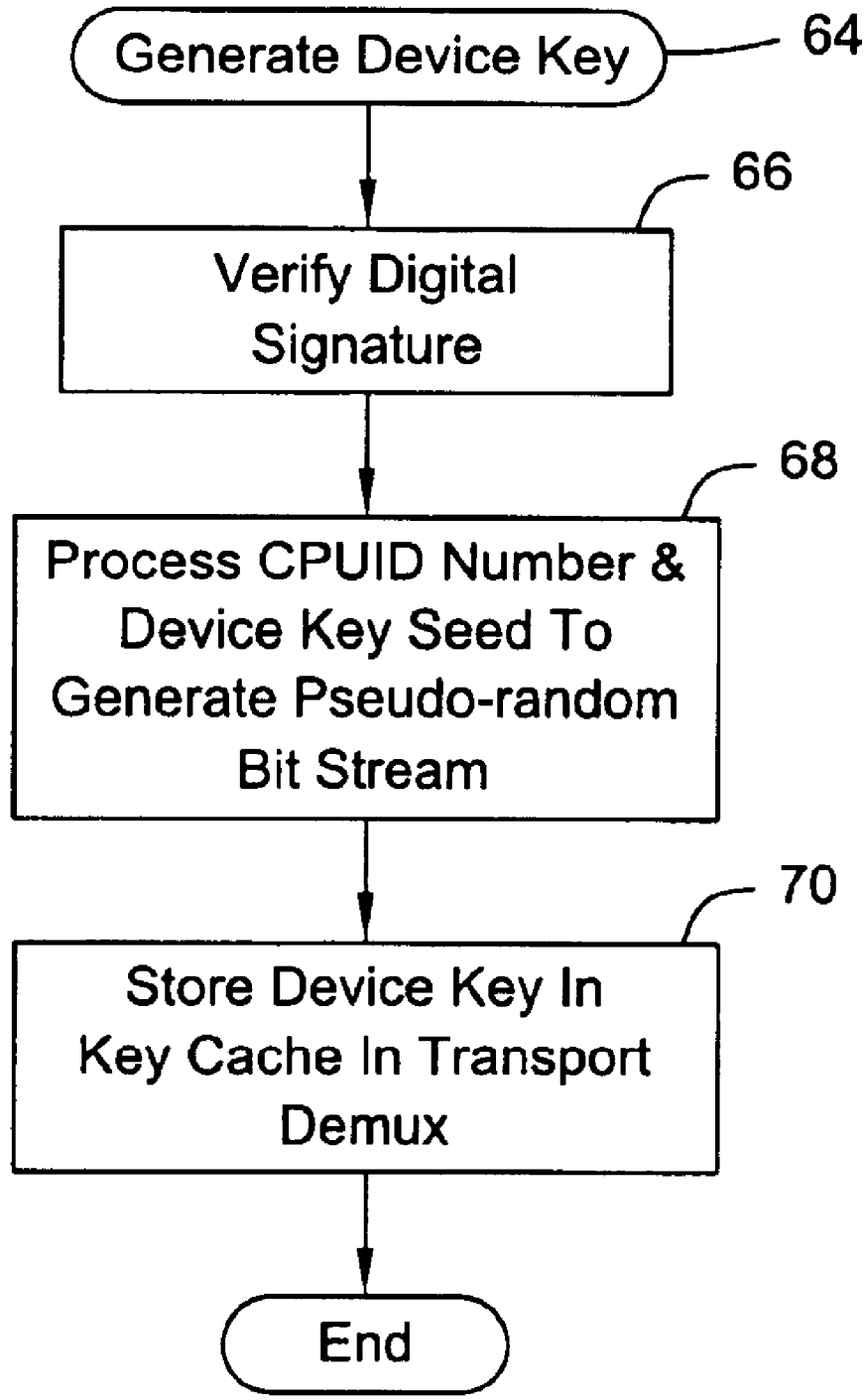
FIG. 4 is a flow chart for developing a device key in accordance with one embodiment of the present invention.

Referring next to FIG. 4, the software 64, in one embodiment, for generating a device key in the key logic 36 initially verifies the digital signature received from the processor 12 as indicated in block 66. The CPUID received and the device key seed received in the digital signature are processed to generate a pseudorandom bit stream (block 68). The new device key is then stored in the memory 35 in the transport demultiplexer 34 as indicated in block 70. Since the key logic 36 and transport demulitplexer 34 are formed in the same integrated circuit 28, it is virtually impossible for a hacker to intercept the communications between the key logic 36 and the transport demuliplexer 34. Alternatively, such communication may also be encrypted.

Figure 5:
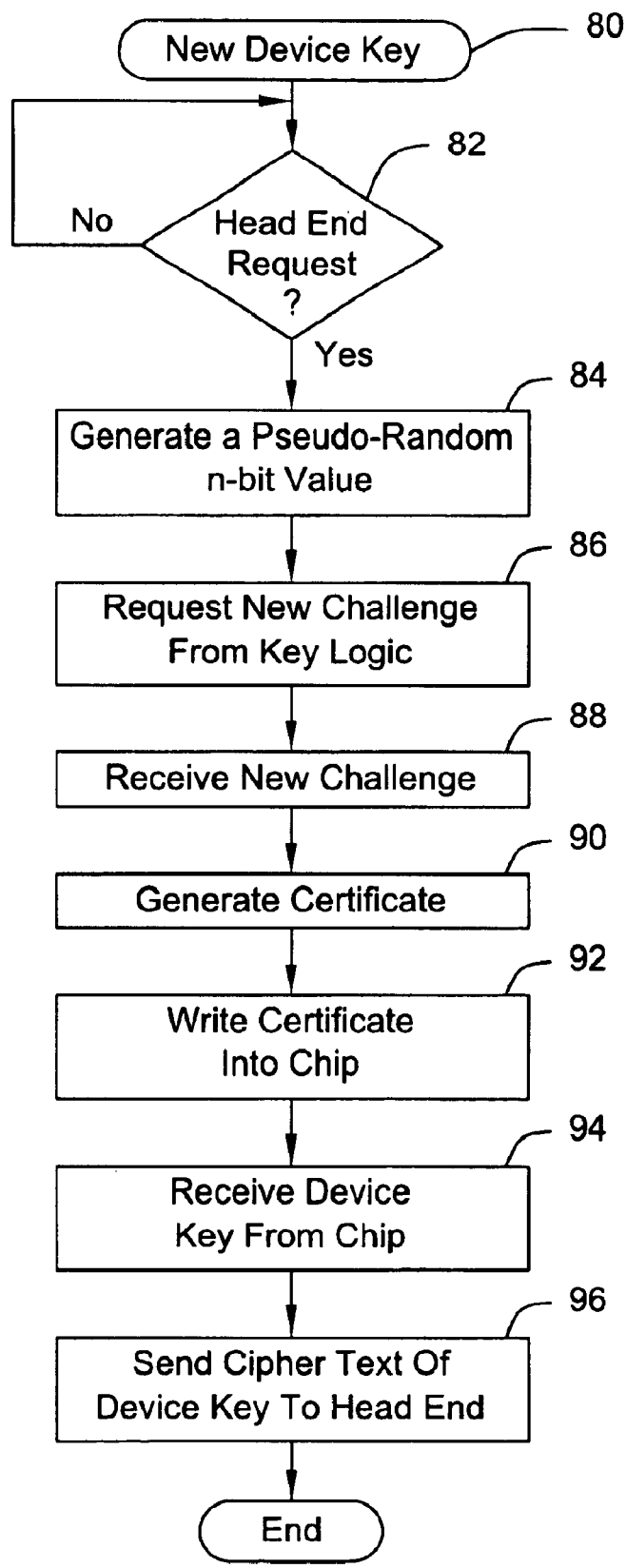
FIG. 5 is a flow chart for software for renewing a device key in accordance with one embodiment of the present invention.

Turning finally to FIG. 5, a new device key may be periodically provided at the request of the head end as indicated in diamond 82. When the processor 12 receives a head end request for a new device key, the processor generates a pseudorandom n-bit value as indicated in block 84. It also requests a new challenge from the key logic 36 as indicated in block 86. When the processor 12 receives the new challenge as indicated in block 88, it generates a certificate as indicated in block 90. The certificate is written to the key logic 36 as indicated in block 92. The device key is received by the host processor from the key logic 36 as indicated in block 94. The processor 12 sends the cipher text of the device key to the head end as indicated in block 96.

Thus, embodiments of the present invention provide secure communication at reasonable cost. The processor 12 is the core of the platform and its unique serial number is not alterable. Thus, in some embodiments the client 10 may avoid making a copy of the device key anywhere in any non-volatile memory. This significantly reduces the cost of protecting the device key. Also, by executing the CPUID instruction at the operating system kernel level, the client 10 effectively prevents hackers from producing a valid certificate for a known processor serial number. Thus, it is extremely difficult to fool the key logic 36 to produce a valid device key without both the serial number and the device key seed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   causing a processor to obtain a random number from an integrated circuit;
   receiving a processor identifier of the processor;
   receiving a seed stored in a non-volatile memory;
   hashing said random number, said processor identifier and said seed to develop a device key; and
   generating a certificate based, at least in part, on the device key.

2. The method of claim 1, wherein the operation of receiving a processor identifier comprises obtaining a processor serial number.

3. The method of claim 1 including obtaining said processor identifier by executing instructions at the operating system kernel level.

4. The method of claim 1 including causing the processor to send said certificate to said integrated circuit.

5. The method of claim 1 including causing said integrated circuit to validate said certificate and process said certificate to generate a new device key.

6. The method of claim 5 including encrypting the new device key using a current device key and sending the encrypted new device key back to the processor.

7. The method of claim 5 including writing said new device key into a memory in said integrated circuit.

8. A method comprising:
   receiving a processor identifier
   receiving a seed stored in a non-volatile memory;
   hashing said identifier and said seed to develop a device key;
   sending said device key to a head end; and
   receiving a digital television broadcast from said head end.

9. An article comprising a medium storing instructions that enable a processor-based system to:
   cause a processor to obtain a random number from an integrated circuit;

receive a processor identifier of the processor;

receive a seed stored in a non-volatile memory;

hash said random number, said processor identifier and said seed to develop a device key; and generate a certificate based, at least in part, on the device key.

10. The article of claim 9, wherein the instructions that enable the processor-based system to receive the processor identifier comprise instructions to obtain a processor serial number.

11. The article of claim 9 further storing instructions that enable the processor-based system to obtain said processor identifier by executing instructions at ring 0.

12. The article of claim 9 further storing instructions that enable the processor-based system to send said certificate to said integrated circuit.

13. The article of claim 9 further storing instructions that enable the processor-based system to cause said integrated circuit to validate said certificate and process said certificate to generate a new device key.

14. The article of claim 13 further storing instructions that enable the processor-based system to encrypt the new device key using a current device key.

15. The article of claim 13 further storing instructions that enable the processor-based system to write said new device key into a memory in said integrated circuit.

16. An article comprising a medium storing instructions that enable a processor-based system to:

receive a processor identifier;

receive a seed stored in a non-volatile memory;

hash said identifier and said seed to develop a device key;

send said device key to head end; and receive a digital television broadcast from the head end.

17. An integrated circuit comprising:

an interface to couple said circuit to a processor-based system;

a transport demultiplexer coupled to said interface to receive audio/video content information;

a key logic circuit to extract a device key from a bit stream including a processor serial number and a device key seed;

a memory to store said device key; and a bus that couples said interface, said transport demultiplexer and said key logic circuit.

18. The circuit of claim 17 wherein said memory is part of said transport demultiplexer.

19. The circuit of claim 17 wherein said key logic circuit generates a random challenge on request from said processor-based system.

20. The circuit of claim 17 wherein said key logic circuit receives a certificate from said processor-based system and processes said certificate to generate a new device key.

21. The circuit of claim 20 wherein said key logic encrypts the new device key using a current device key.

22. A processor-based system comprising:

a processor that stores instructions that enable said processor to obtain a processor serial number;

a non-volatile memory, coupled to said processor, to store a device key seed; and an integrated circuit coupled to said processor, said integrated circuit including a key logic circuit that generates a random challenge upon request from said processor;

wherein said key logic circuit extracts a device key from a bit stream including the processor serial number and the device key seed.

23. The system of claim 22 including a memory in said integrated circuit, said key logic circuit enabling said device key to be stored in said memory.

24. The system of claim 23 wherein said integrated circuit includes a transport demultiplexer that receives content from an external source, said memory being included as part of said transport demultiplexer.

* * * * *